United States Patent

Heinzelmann

(10) Patent No.: US 7,857,724 B2
(45) Date of Patent: Dec. 28, 2010

(54) MULTI-GROUP GEARBOX

(75) Inventor: Karl-Fritz Heinzelmann, Meckenbeuren (DE)

(73) Assignee: ZF Friedrichshafen AG, Friedrichshafen (DE)

(*) Notice: Subject to any disclaimer, the term of this patent is extended or adjusted under 35 U.S.C. 154(b) by 542 days.

(21) Appl. No.: 11/792,889

(22) PCT Filed: Nov. 29, 2005

(86) PCT No.: PCT/EP2005/012711

§ 371 (c)(1),
(2), (4) Date: Jun. 12, 2007

(87) PCT Pub. No.: WO2006/063676

PCT Pub. Date: Jun. 22, 2006

(65) Prior Publication Data

US 2008/0032846 A1  Feb. 7, 2008

(30) Foreign Application Priority Data

Dec. 14, 2004 (DE) .................... 10 2004 060 057

(51) Int. Cl.
*F16H 37/02* (2006.01)

(52) U.S. Cl. .................... 475/214; 475/215; 475/218

(58) Field of Classification Search .............. 475/214, 475/302, 303, 215, 218; 74/325
See application file for complete search history.

(56) References Cited

U.S. PATENT DOCUMENTS

| | | | | |
|---|---|---|---|---|
| 2,259,731 A * | 10/1941 | Burtnett | ................... | 475/261 |
| 3,080,772 A * | 3/1963 | Foerster | ................... | 475/54 |
| 4,392,394 A * | 7/1983 | Hofbauer et al. | ................... | 475/204 |
| 4,619,150 A | 10/1986 | Wiggenhauser | | |
| 4,777,837 A * | 10/1988 | Lehle | ................... | 74/360 |
| 5,385,066 A | 1/1995 | Braun | ................... | 74/331 |
| 6,012,345 A * | 1/2000 | Wafzig et al. | ................... | 74/50 |
| 7,350,430 B2 * | 4/2008 | Heinzelmann | ................... | 74/325 |
| 2004/0029683 A1 | 2/2004 | Steen | | |
| 2004/0033858 A1* | 2/2004 | Sumi | ................... | 475/214 |
| 2006/0166787 A1 | 7/2006 | Heinzelmann | | |

FOREIGN PATENT DOCUMENTS

| | | |
|---|---|---|
| DE | 960 520 | 3/1957 |
| DE | 27 34 740 | 2/1979 |
| DE | 28 42 943 | 4/1980 |
| DE | 30 12 778 | 10/1981 |
| DE | 41 21 709 | 1/1992 |
| DE | 44 22 900 | 11/1994 |
| DE | 199 49 490 | 4/2001 |
| DE | 10051354 A1 * | 5/2002 |
| DE | 101 52 861 | 5/2003 |
| DE | 102 39 396 | 3/2004 |
| EP | 0 657 667 | 11/1994 |
| WO | WO 2004/104445 | 12/2004 |

OTHER PUBLICATIONS

Translation of IDS reference DE 2842943.*
Translation of IDS reference DE 2734740.*
Translation of IDS reference DE 2842943, Sep. 2, 2009.*
Translation of IDS reference DE 2734740, Sep. 2, 2009.*

* cited by examiner

*Primary Examiner*—Tisha D Lewis
(74) *Attorney, Agent, or Firm*—Davis & Bujold, P.L.L.C.

(57) ABSTRACT

A multi-group transmission for a motor vehicle having a main transmission and a range group transmission downstream from the main transmission. The reverse gear is integrated into the range-group transmission.

15 Claims, 1 Drawing Sheet

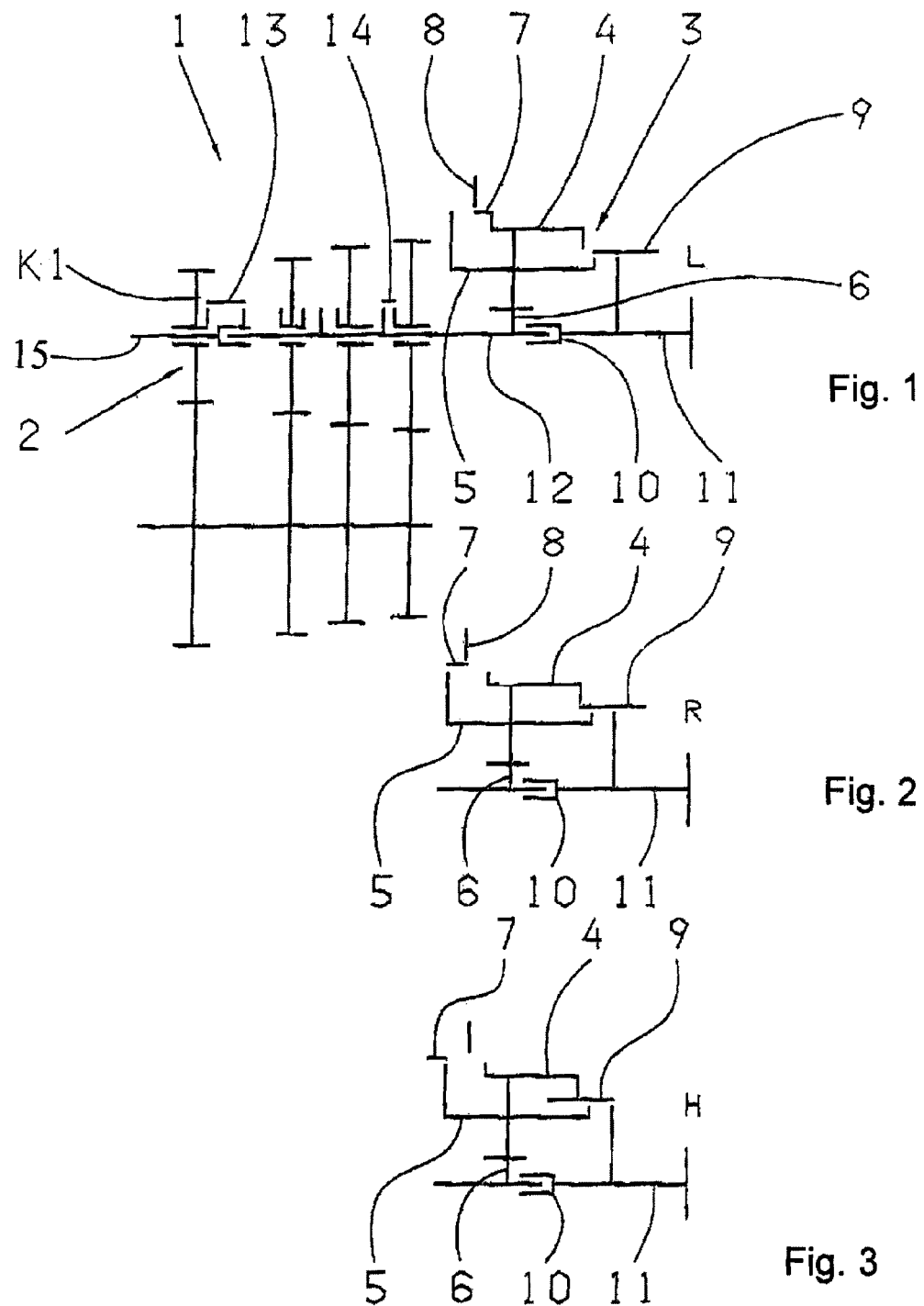

MULTI-GROUP GEARBOX

This application is a national stage completion of PCT/EP2005/012711 filed Nov. 29, 2005 which claims priority from German Application Serial No. 10 2004 060 057.0 filed Dec. 14, 2004.

FIELD OF THE INVENTION

The present invention concerns a multi-group transmission.

BACKGROUND OF THE INVENTION

Multi-speed-transmissions, for example transmissions for utility vehicles, are usually designed as multi-group transmission with eight, nine, ten, twelve or more speeds. This is achieved by combining at least two individual multi-speed transmissions. The complete transmission is frequently composed of a main transmission and a range group transmission, where in most cases the range group transmission is downstream from the main transmission and, for example, enables two gear ratio ranges, whereby the number of speeds of the main transmission is doubled.

Furthermore, multi-group transmissions are known that are divided into an upstream group, a main transmission and a range group. The upstream group is most frequently designed as a splitter group to compress the speeds and comprises two speeds and the main transmission and the upstream group are designed to have a 1- or 2-countershaft construction.

In multi-group transmissions of the prior art, the range group transmission is designed as a planetary gear set of short dimensions or is realized as a two-countershaft-group, where the reverse gear is integrated into the main transmission. An example of a reverse gear integrated in a wheel-reversing transmission or main transmission of a multi-group transmission can be found in DE 30 12 778 filed by the applicant of this current invention. The integration of the reverse gear into the main transmission demands appropriate gears as well as an additional shifting element for shifting the reverse gear.

A planetary range group transmission of a multi-group transmission is already known to the applicant from DE 41 21 709, for example. It comprises a sun gear arranged rotationally fixed on an output shaft of the main transmission, a ring gear connected rotationally fixed to the transmission housing, via a first clutch, for shifting a slow gear, and a bar forming the output drive. A second clutch is provided that can be activated jointly with the first clutch and connects the shaft to the output shaft of the main transmission when the first clutch is disengaged.

The object of the present invention is to provide a motor vehicle multi-group transmission that requires less space than a corresponding transmission of the prior art. Furthermore, the inventive transmission should be lightweight and economical to manufacture. Finally, the inventive multi-speed transmission should demonstrate optimal efficiency at all speeds.

SUMMARY OF THE INVENTION

Accordingly, a multi-group transmission for a motor vehicle is proposed that comprises a main transmission and a range group transmission, located downstream from the main transmission, wherein a reverse gear is integrated into the range group transmission.

The range group transmission is preferably of planetary configuration, thereby facilitating compact construction.

In the scope of an especially advantageous embodiment of the invention, it is provided that the main transmission gears are used to realize the different gear ratios for reverse.

According to the invention, the multi-group transmission can also feature an upstream group that is preferably of 1- or 2-countershaft design.

Through the inventive conception, the prior art feature of a sprocket chain with the corresponding intermediate wheels for reversing the direction of rotation is omitted from the main transmission, resulting in improved efficiency in all speeds. This also allows the transmission to be of shorter length.

To further optimize the efficiency of the inventive multi-group transmissions with the reverse gear integrated in the range group transmission, the applicant also proposes in DE 102 39 396 A1, the full disclosure, content of which should also be the object of this description, designing the transmission in such a way that the main transmission features at least one direct gear, where the components not involved in the flow of force in the direct gear are either fully or partly disconnected when the direct gear is engaged.

In particular, for transmissions with an input drive constant, the gearing arranged on the input-side drive shaft is designed to be engaged and disengaged by means of a shifting element so that the countershaft does not rotate along with it in a direct gear. For a transmission with two input drive constants, the shifting sleeve between the input drive constants is switched to "neutral" in an advantageous manner.

According to the invention, the input drive of the range group transmission can be directly connected to the output drive in the direct gear.

Through the aforementioned constructive measures for shifting the direct gear, a transmission is produced that has increased efficiency both in a direct gear as well as in the other speeds.

BRIEF DESCRIPTION OF THE DRAWINGS

The invention is explained in further detail below aided by the attached drawings, in which:

FIG. 1 is a schematic illustration of a first position of a planetary range group transmission with integrated reverse gear;

FIG. 2 is a schematic illustration of a second position of a planetary range group transmission with integrated reverse gear; and FIG. 3 is a schematic illustration of a third position of a planetary range group transmission with integrated reverse gear.

DETAILED DESCRIPTION OF THE INVENTION

The drawing illustrates a multi-group transmission 1 comprising a main transmission 2 and a range group transmission 3 in planetary configuration. The range group transmission comprises a ring gear 4, a bar 5 and a sun gear 6, where the sun gear 6 is constantly connected to main shaft 12 which is supported by a bearing 10. The planetary transmission comprises two shifting elements, which are preferably designed as shifting sleeves 7 and 9, each with three settings. To illustrate shifting positions, the planetary transmission 3 is drawn as FIGS. 1, 2 and 3, specifically in the respective positions L (low), R (reverse) and H (high).

FIG. 1 shows that in position L the ring gear 4 is nonrotatably connected to the housing 8, via a first shifting sleeve 7, while the shaft 5 of the planetary gear set is connected to the output drive 11, via a second sliding sleeve 9. When reverse is engaged, as shown in FIG. 2, the shaft 5 is nonrotatably connected to the housing 8, via the shifting sleeve 7, while the ring gear 4 is connected to the output drive 11, via the shifting sleeve 9. In the H-position, as shown in FIG. 3, the shaft 5 and the ring gear 4 are connected to the output drive 11.

In FIG. 1, the first constant K1 is connected to the input drive, via a sliding sleeve 13, and in the main transmission 2 the first gear is engaged, via the sliding sleeve 14.

Of course, any constructive designs, in particular any spatial arrangement of the elements of the range group transmission on their own or in relation to one another and to the extent technically sensible, fall under the protective scope of the present claims without influencing the function of the transmission, as it is stated in the claims, even if these designs are not explicitly illustrated in the drawing or description.

REFERENCE NUMBERS

| 1 | Multi-group transmission |
| 2 | Main transmission |
| 3 | Range group transmission |
| 4 | Ring gear |
| 5 | Shaft |
| 6 | Sun gear |
| 7 | Shifting sleeve |
| 8 | Housing |
| 9 | Shifting sleeve |
| 10 | Bearing |
| 11 | Output drive |
| 12 | Main shaft |
| 13 | Shifting sleeve |
| 14 | Shifting sleeve |
| K1 | Drive constant |

The invention claimed is:

1. A multi-group transmission for a motor vehicle comprising:
   a main transmission having a main shaft (12), and
   a planetary range group transmission separate from and located downstream from the main transmission,
   wherein a reverse gear is integrated into the planetary range group transmission (3),
   the planetary range group transmission (3) comprises a ring gear (4), a shaft (5) and a sun gear (6), the sun gear (6) is nonrotatably connected to the main shaft (12), and the planetary range group transmission (3) Includes one of two shifting elements and two shifting sleeves (7, 9) to facilitate at least three shift positions, including a reverse gear position, of the planetary range group transmission, and
   the main transmission (2) includes at least one direct gear and, if the direct gear is engaged, components of the main transmission (2), not involved in a flow of force, are at least partially disengaged.

2. The multi-group transmission for a motorvehicle according to claim 1, wherein gears of the main transmission facilitate different gear ratios for the reverse gear of the main/range transmission.

3. The multi-group transmission for a motor vehicle according to claim 1, wherein the main transmission (2) has one of a 1-countershaft construction and a 2-countershaft construction.

4. The multi-group transmission for a motor vehicle according to claim 1, wherein the multi-group transmission includes an upstream group.

5. The multi-group transmission for a motor vehicle according to claim 4, wherein the upstream group has one of a 1-countershaft construction and a 2-countershaft construction.

6. The multi-group transmission for a motor vehicle according to claim 1, wherein an input drive of the planetary range group transmission is directly connectable to an output drive of the planetary range group transmission when the multi-group transmission is in the direct gear.

7. A multi-group transmission for a motor vehicle comprising:
   a main transmission, and
   a range group transmission located downstream from the main transmission,
   wherein a reverse gear is integrated into the range group transmission (3), and the range group transmission is a planetary transmission (3) comprising a ring gear (4), a shaft (5) and a sun gear (6), the sun gear is nonrotatably connected to a main shaft (12), and the planetary range group transmission (3) includes one of two shifting elements and two shifting sleeves (7, 9) to facilitate at least three shift positions, and
   when the range group transmission (3) is in a low position (L), the ring gear (4) is fixedly connected to a housing (8), via a first shifting sleeve (7), and the shaft (5) is connected to an output drive (11), via a second shifting sleeve (9), when the range group transmission (3) is in a reverse position (R), the shaft (5) is fixedly connected to the housing (8), via the first shifting sleeve (7), and the ring gear (4) is connected to the output drive (11), via the second shifting sleeve (9), and when the range group transmission (3) is in a high position (H), the shaft (5) and the ring gear (4) are connected to the output drive (11).

8. The multi-group transmission for a motor vehicle according to claim 7, wherein gears of the main transmission facilitate different gear ratios for the reverse gear of the transmission.

9. The multi-group transmission for a motor vehicle according to claim 7, wherein the main transmission (2) has one of a 1-countershaft construction and a 2-countershaft construction.

10. The multi-group transmission for a motor vehicle according to claim 7, wherein the multi-group transmission includes an upstream group.

11. The multi-group transmission for a motor vehicle according to claim 10, wherein the upstream group has one of a 1-countershaft construction and a 2-countershaft construction.

12. The multi-group transmission for a motor vehicle according to claim 7, wherein the main transmission (2) includes at least one direct gear and, if the direct gear is engaged, components of the main transmission (2), not involved in a flow of force, are at least partially disengaged.

13. The multi-group transmission for a motor vehicle according to claim 7, wherein the main transmission (2) includes an input drive constant (K1), having gear teeth, which is located on an input drive shaft (15), the input drive constant one of engages and disengages, via a shifting sleeve (13), the input drive shaft (15), such that when a direct gear is engaged, a countershaft does not rotate with the input drive shaft, and the main transmission further includes at least one additional input drive constant and at least one additional shifting sleeve, such that when the direct gear is engaged, the sliding sleeves between the input drive constants are shifted into a neutral position.

14. The multi-group transmission for a motor vehicle according to claim 12, wherein an input drive of the range group transmission is directly connectable to the output drive when the multi-group transmission is in the direct gear.

15. A multi-group transmission for a motor vehicle comprising:
- a main transmission having a main shaft (12), and
- a planetary range group transmission separate from and located downstream from the main transmission,
- wherein a reverse gear is integrated into the planetary range group transmission (3),
- the planetary range group transmission (3) comprises a ring near (4), a shaft (5) and a sun gear (6), the sun gear (6) is nonrotatably connected to the main shaft (12), and the planetary rangegroup transmission (3) includes one of two shifting elements and two shifting sleeves (7, 9) to facilitate at least three shift positions, including a reverse gear position, of the planetary range croup transmission: and
- the main transmission (2) includes an input drive constant (K1), having gear teeth, which is located on an input drive shaft (15), the input drive constant one of engages and disengages, via a shifting sleeve (13), with the input drive shaft (15) such that when a direct gear is engaged, a countershaft does not rotate with the input drive shaft, and the main transmission further includes at least one additional input drive constant and at least one additional shifting sleeve such that when the direct gear is engaged, the shifting sleeves between the input drive constants are shifted into a neutral position.

* * * * *